United States Patent
Baumert

(10) Patent No.: US 9,359,810 B2
(45) Date of Patent: Jun. 7, 2016

(54) FLUIDTIGHT FIRE DOOR

(75) Inventor: Bernard Baumert, Schaeffersheim (FR)

(73) Assignee: BAUMERT TECHNOLOGIES, Schaeffersheim (FR)

( * ) Notice: Subject to any disclaimer, the term of this patent is extended or adjusted under 35 U.S.C. 154(b) by 182 days.

(21) Appl. No.: 13/882,254

(22) PCT Filed: Oct. 27, 2010

(86) PCT No.: PCT/FR2010/052307
§ 371 (c)(1),
(2), (4) Date: May 21, 2013

(87) PCT Pub. No.: WO2012/056117
PCT Pub. Date: May 3, 2012

(65) Prior Publication Data
US 2015/0033646 A1    Feb. 5, 2015

(51) Int. Cl.
| | |
|---|---|
| *E06B 5/16* | (2006.01) |
| *E04B 1/94* | (2006.01) |
| *C09K 21/00* | (2006.01) |
| *E06B 5/18* | (2006.01) |
| *E06B 3/70* | (2006.01) |

(52) U.S. Cl.
CPC .............. *E06B 5/164* (2013.01); *C09K 21/00* (2013.01); *E04B 1/94* (2013.01); *E06B 5/16* (2013.01); *E06B 5/18* (2013.01); *E06B 2003/703* (2013.01); *E06B 2003/7032* (2013.01); *E06B 2003/7051* (2013.01)

(58) Field of Classification Search
CPC ............. E06B 5/16; E06B 5/164; E06B 5/18; E06B 2003/703; E06B 2003/7032; E06B 2003/7051; E04B 1/94; C09K 21/00
USPC ................................... 52/232, 309.4, 784.15
See application file for complete search history.

(56) References Cited

U.S. PATENT DOCUMENTS

| | | | | | |
|---|---|---|---|---|---|
| 2,219,962 | A | * | 10/1940 | Reynolds ............... | F16J 15/123 126/190 |
| 2,757,225 | A | * | 7/1956 | Dunn ........................... | 174/364 |

(Continued)

FOREIGN PATENT DOCUMENTS

| | | | |
|---|---|---|---|
| DE | 26 39 691 | A1 | 3/1978 |
| DE | 3836628 | A1 | 5/1990 |

(Continued)

OTHER PUBLICATIONS

International Search Report issued on Jul. 25, 2011 in corresponding application No. PCT/FR2010/052307.

*Primary Examiner* — Charles A Fox
*Assistant Examiner* — Joseph J Sadlon
(74) *Attorney, Agent, or Firm* — Carter, DeLuca, Farrell & Schmidt, LLP

(57) ABSTRACT

The subject of the present invention is a watertight fire door for closing an opening in a building or edifice comprising, on the one hand, a fixed frame and at least one opening leaf and, on the other hand, sealing means that provide sealing between the fixed frame and the opening leaf when the door is closed. The or each opening leaf comprises, on the one hand, a framework surrounding an empty space capable of accepting or forming a thermal insulator and being sandwiched between two layers and of thermal insulation each essentially produced from a material having low thermal conductivity or diffusivity and, on the other hand, if appropriate, at least one thermal break.

16 Claims, 3 Drawing Sheets

(56) References Cited

U.S. PATENT DOCUMENTS

Figure 1:
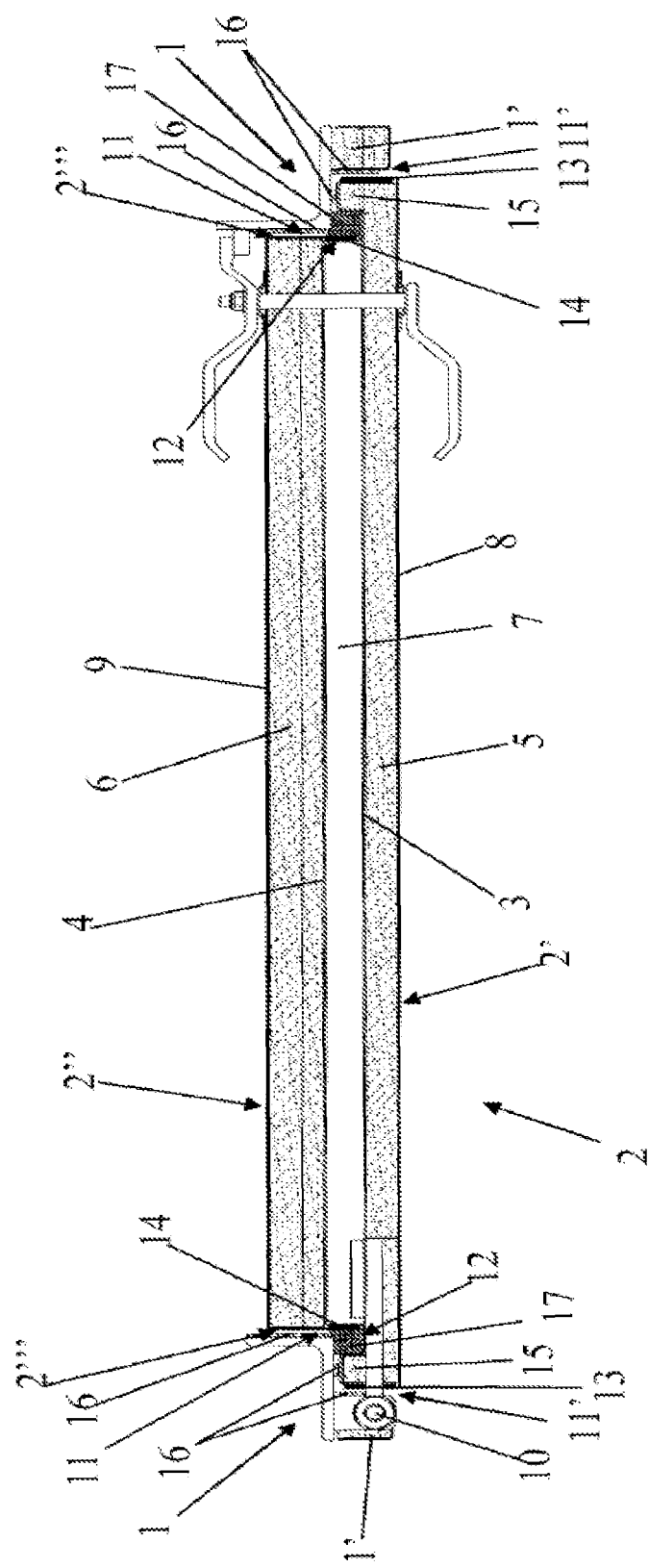

| | | | | |
|---|---|---|---|---|
| 2,939,452 | A * | 6/1960 | Kamin | A47J 39/00 126/190 |
| 3,838,931 | A * | 10/1974 | Valla | 404/69 |
| 4,532,915 | A * | 8/1985 | de Rham | F23J 13/08 126/242 |
| 5,635,118 | A * | 6/1997 | Merser | 264/46.4 |
| 5,816,017 | A * | 10/1998 | Hunt et al. | 52/784.11 |
| 5,916,077 | A * | 6/1999 | Tang | E06B 1/325 49/501 |
| 6,159,899 | A | 12/2000 | Hudetz et al. | |
| 6,519,899 | B1 * | 2/2003 | Hurzeler | 49/501 |
| 6,643,991 | B1 * | 11/2003 | Moyes | 52/784.11 |
| 2011/0314762 | A1 * | 12/2011 | Widmer | E06B 3/825 52/656.4 |

FOREIGN PATENT DOCUMENTS

| | | | |
|---|---|---|---|
| DE | 3348343 C2 | 11/1993 | |
| DE | 196 25 643 A1 | 1/1998 | |
| DE | 3348344 C2 | 9/1999 | |
| DE | 19930948 A1 * | 1/2001 | E06B 1/08 |
| DE | 10 2008 040303 B3 | 9/2009 | |
| EP | 0 076 025 A1 | 4/1983 | |
| EP | 0 294 265 A1 | 12/1988 | |
| FR | 2258512 A1 * | 8/1975 | E06B 5/16 |
| FR | 2319000 A1 * | 2/1977 | E06B 5/16 |
| FR | 2404094 A1 * | 4/1979 | E05B 1/0015 |
| GB | 2031977 A * | 4/1980 | E06B 3/34 |
| ZA | 8803608 A * | 7/1989 | E06B 5/16 |

* cited by examiner

FLUIDTIGHT FIRE DOOR

The present invention concerns the field of fluidtight fire doors closing an opening in a high-security building or edifice, more particularly a high-security building of a nuclear reactor system, and has as the objective a fluidtight fire door.

It is known that a fluidtight door closing an entry/exit opening in premises or serving as a barrier door to the interior of a high-security building such as a nuclear power plant is generally impervious, on the one hand to air or another gaseous fluid, creating atmospheric isolation preventing, more particularly, any of contaminating the air associated with the nuclear activity and, on the other hand, to water, protecting the building from flooding or a rapid rise in water.

Such a sealed door is also usually provided to fight the propagation of fires in the buildings. It is designed for this so as to obtain mechanical stability against the fire, tightness against flames, hot gases, and smoke, and thermal insulation for a length of time defined by the exposure to fire of one of the sides of the door.

The thermal insulation of a door is its capacity to resist exposure to fire on one of its sides without letting it past or limiting its transmission, consequently limiting high heat transfer, by propagation, radiation, or conduction, from the exposed side to the unexposed side, lest the latter, or any material or element found close by, catch fire. It is, further, the ability of the door to resist fire on one of its sides that ensures the protection, if need be, for persons located in the vicinity of the door on the unexposed side.

Such a fluidtight fire door includes a frame and at least one opening leaf generally mounted pivoting on the frame, thanks to at least one hinge a part of which is affixed to one of the narrow sides or edge of the opening leaf. In addition, the opening leaf usually includes two broad and two narrow faces forming the edge of the opening leaf in which is usually executed an L-shaped rabbet capable of receiving the frame. In addition, the opening leaf is capable of being applied, in a closed position of the door, against the frame, which will flatten against the base of the rabbet, by the intermediary of sealed joints, specifically ensuring the tightness of the door against liquid or gaseous fluids and against fire between the opening leaf and the frame.

Moreover, the opening leaf is generally made up of a filler and thermal-insulation structure held between two rigid metal plates, of the steel-sheet type, providing the framework of the door and each forming one of the broad faces of the opening leaf.

In order to determine whether such a door fulfills these conditions of stability, tightness, and thermal insulation against fire, checks are made in the course of trials. As for the stability of the door in a fire, these checks specifically have the goal of ascertaining whether or not cracks or openings appear in the door and, if so, of verifying whether they exceed the requisite dimensions. As for the tightness of the door, these checks specifically have the goal of measuring the length of time after which a cotton plug applied to the broad unexposed face of the opening leaf of the door catches fire. Finally, as to the thermal insulation, the rise in temperature at the broad unexposed face of the opening leaf must not exceed the initial average temperature by more than 140° C., with a maximum rise in temperature limited to 180° C. everywhere on the opening leaf, and a rise in temperature not exceeding 180° C. everywhere on the frame, depending on the grade of classification.

And yet, in current fluidtight fire doors, faults may be observed in their ability to prevent or severely limit the transmission of heat from the exposed side to the unexposed side and particularly in doors installed in high-security buildings such as the buildings of a nuclear power plant. Indeed, temperature measurements carried out on the unexposed side of the door, particularly on the broad face of the opening leaf and more particularly at the two upper corners of the latter, show that the localized temperature exceeds by far the maximum aforementioned values imposed by the corresponding classification, as far as thermal insulation is concerned.

The present invention has the goal of compensating for these drawbacks by proposing a pivoting fire door impervious to a gaseous or liquid fluid for a building or edifice, more particularly for a building of a nuclear reactor system, which is capable of preventing, during the exposure of one of its sides to fire, excessive rises in temperature on its other, not exposed, side for a length of time allowing the very stringent, current regulations to be met, and future ones.

For this purpose, the objective of the present invention is a pivoting, fluidtight fire door for closing an opening in a building or edifice, more particularly a nuclear power-plant building, including, on the one hand, a frame and at least one opening leaf including two broad, opposing faces, parallel to one another, that is, a first broad face and a second broad face, and bounded laterally by narrow faces, forming the edge of the opening leaf, perpendicular to said broad faces, and on the other hand, means of sealing, ensuring tightness between the frame and the opening leaf in the closed state of the door, and characterized essentially in that the or each opening leaf includes a metal framework surrounding an empty space capable of receiving or forming thermal insulation, said framework being held between two layers of thermal insulation extending parallel to the broad faces of the opening leaf, that is, a first layer located beside the first broad face and a second layer located beside the second broad face, said layers being capable of preventing, in the event of one of the said broad faces being exposed to fire, the propagation of heat radiation from the latter to the other of the said broad faces and in that, if need be, the said opening leaf includes at least one thermal break.

Figure 2:
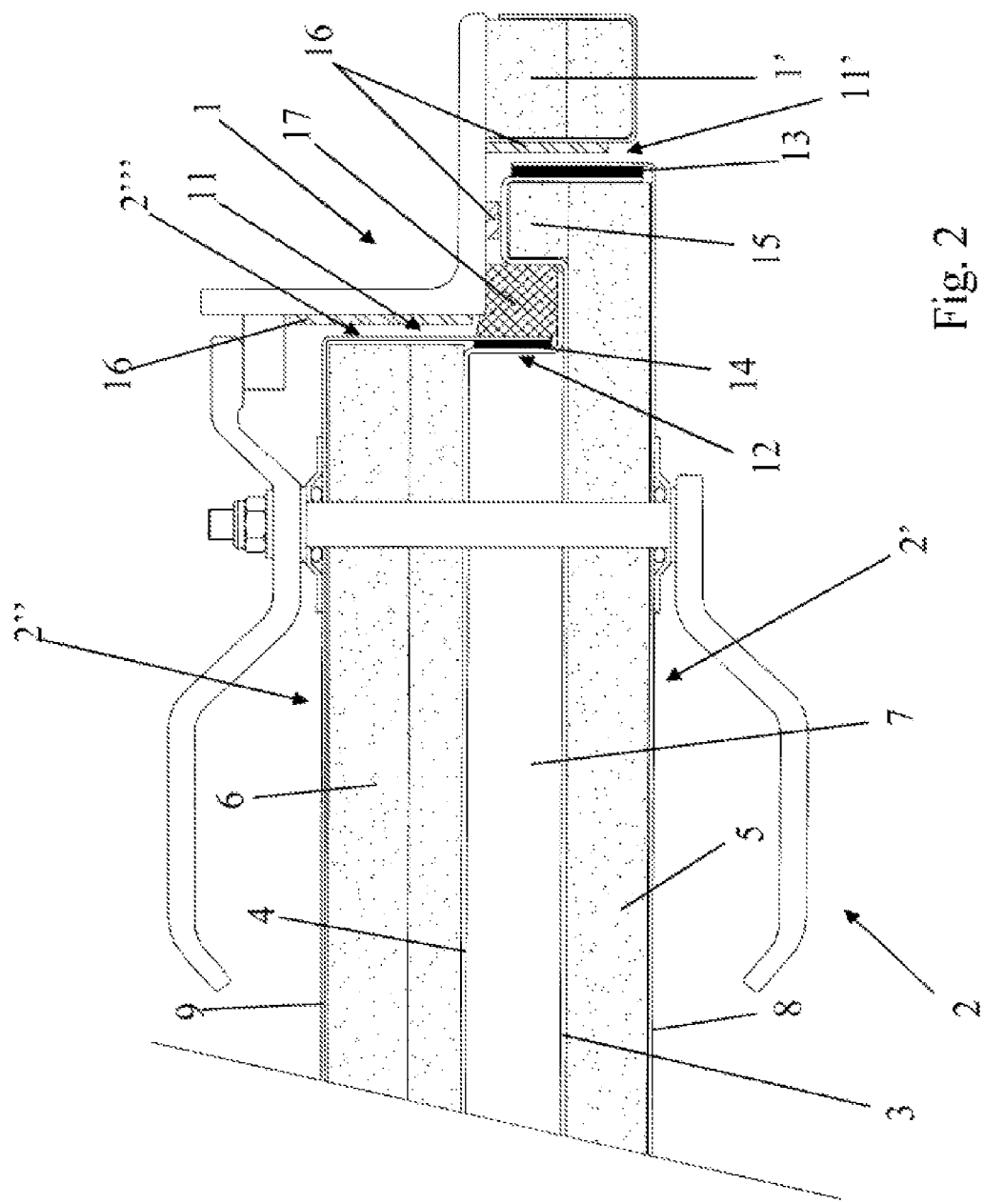
Figure 3:
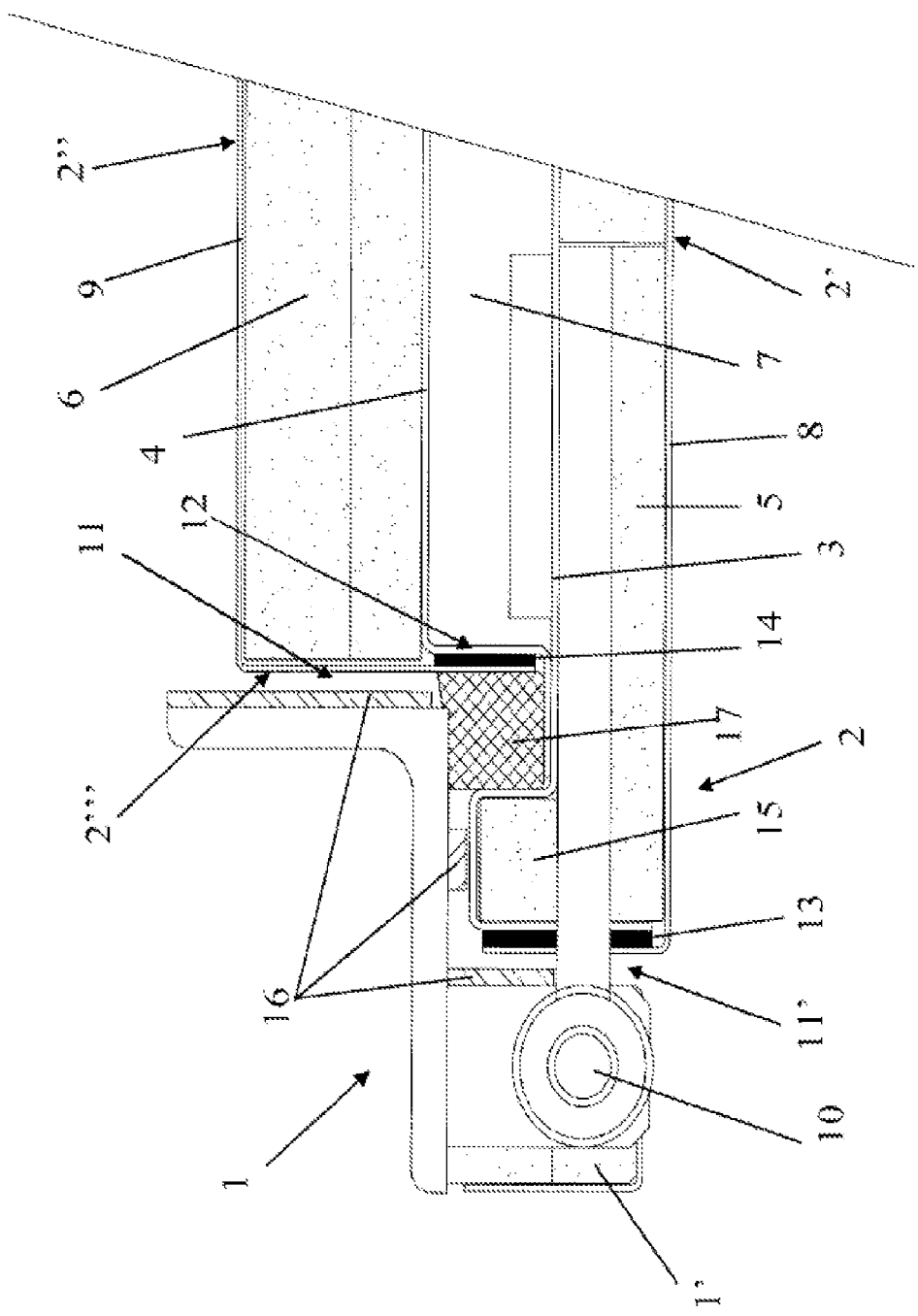

The invention will be better understood thanks to the description hereinafter which is related to a preferred embodiment, given by way of a non-limiting example and explained with reference to the attached schematic drawings, in which:

FIG. 1 shows a cross-sectional view of a door according to the present invention in a preferred embodiment, FIG. 2 shows a part of the door represented in FIG. 1, handle side, enlarged, FIG. 3 shows a part of the door represented in FIG. 1, hinge side, enlarged.

The figures show a pivoting fire door, impervious specifically to a liquid or gaseous fluid, for closing an opening in a building or edifice, more particularly a high-security building such as a nuclear power plant, including, on the one hand, a frame 1 and at least one opening leaf 2 including two broad faces 2' and 2" opposite and parallel to one another, that is, a first broad face 2' and a second broad face 2", and being bounded laterally by narrow faces 2''', forming the edge of the opening leaf 2, which are perpendicular to said broad faces 2' and 2", and on the other hand, means of sealing 16,17, ensuring tightness between the frame 1 and the opening leaf 2 in the closed state of the door.

In accordance with the present invention, the or each opening leaf 2 includes a metal framework 3,4, preferably of steel, surrounding an empty space capable of receiving or forming a thermal insulator 7 and held between two layers 5 and 6 of thermal insulation, extending parallel to the broad faces 2' and 2" of the opening leaf 2, that is, a first layer 5 located beside the first broad face 2' and a second layer 6 located beside the second broad face 2". The first and second layers 5 and 6 are capable of preventing, in the event of one of the said broad faces 2' and 2" being exposed to fire, the propagation of heat radiation from the latter to the other of the said broad faces 2' or 2".

Preferably, the frame 1 can be metal, preferably steel, or executed starting with any other material ensuring its rigidity, and it includes a visible face on one of the sides of the door, in the closed state of the latter, which can advantageously be covered, at least partially, over all or part of the periphery of the frame 1, more particularly in the case in which the opening leaf 2 and the frame 1 each include a further rabbet, 11 and 11' respectively, a layer of insulating material 1' possessing a thermal insulating ability in order to limit rises in temperature on the said visible face of the frame 1.

It will be noted that the part of the building or of the edifice in which the door is mounted according to the present invention is not depicted on the figures attached.

In addition, if need be, the opening leaf 2 can include at least one thermal break, that is, any means allowing any possible thermal short circuit to be suppressed between two metal parts in contact with one another or appreciably separated from one another.

In a preferred embodiment, the thermal insulator can be formed by the empty space and can consist of the air 7 imprisoned in said framework 3,4.

In another embodiment, the thermal insulator can be added and can consist preferably of rock or glass wool or other material with low thermal conductivity or diffusivity, at least partially filling the empty space.

So as to reinforce the rigidity and the stability of the opening leaf 2, a support structure, not depicted in the figure, which can be made up of rigid metal bars, for instance, preferably of steel and with an omega-shaped cross-section, can be disposed and held securely in the empty space of the framework 3,4, if need be, sharing the empty space with the thermal insulator added or integrated into it.

In a preferred embodiment of the present invention, the framework can be made up of two rigid metal plates 3 and 4, preferably of the rigid metal-sheet type, of steel, held far apart from one another, parallel to each other and to the first and second broad faces 2' and 2" of the opening leaf 2, in such a way as to leave an empty space between them to form or receive the thermal insulator 7, that is, a first plate 3 located beside the first broad face 2' and a second plate 4 located beside the second broad face 2" of the opening leaf 2.

The metal bars can be affixed to one and/or the other of the respective faces of the corresponding metal plates 3 and/or 4, preferably by welding or gluing.

Moreover, in order to further reinforce the thermal insulation of the door, a layer of material capable of creating an obstacle to the radiation of the heat coming from the first or the second broad face 2' or 2", can be applied, for instance by spraying or spattering, onto one and/or the other of the respective inner faces of the first and second plates 3 and 4.

In a preferred, as always, embodiment of the present invention, the first layer 5 can consist of an insulating panel or first panel covering the outer face of the first plate 3, and the second layer 6 can also consist of an insulating panel or second panel covering the outer face of the second plate 4.

In addition, the outer face of the first panel 5 can be covered by a metal facing 8 or first facing, preferably of the rigid, steel-sheet type, for protecting the first panel and the external face of the second panel 6 can be covered by a metal facing 9 or second facing, of the steel-sheet type to protect the second panel.

The first and second panels 5 and 6 can each include two broad sides extending, in the assembled state, parallel to the broad faces of the opening leaf 2' and 2", and narrow sides extending parallel to the edge 2''' of the latter.

Preferably, each insulating panel 5 or 6 can be executed starting with a material with low thermal conductivity or diffusivity, such as a composite material or an inorganic material, preferably of calcium silicate, or it can be a plaster plate.

More particularly, each insulating panel 5 or 6 can be capable of containing or retaining water that can absorb, in the event of one of the sides of the door being exposed to fire, the heat released by the latter and can thereby form a further obstacle to the propagation of heat radiation from the exposed side to the unexposed side of the door, this occurring for some time, up to the total evaporation of the water contained in the corresponding insulating material.

Among the materials capable of containing or retaining water, a silico-calcareous material could be cited, for example, of which the resulting insulating panel used in the present invention as a first or second insulating panel 5 or 6, can be an non-combustible silico-calcareous plate known by the name and under the registered trademark of PROMATECT-H, containing about 5 to 10% moisture content relative to air.

In addition, if need be, the material making up the material layer 1' of the frame 1 can be identical to the material principally making up the first and second panels 5 and 6 of the opening leaf 2.

In a preferred embodiment of the door according to the present invention, the or each opening leaf 2 can be mounted pivoting on the frame 1, thanks to at least one hinge 10 including a mobile part affixed, preferably, to the opening leaf 2 on one of the narrow sides of the first panel 5 and a part affixed on the frame 1, that is, specifically on the visible face of the frame 1.

If we now refer specifically to FIGS. 2 and 3, it may be seen that the broad sides of the first panel 5 can have dimensions greater than those of the broad sides of the second panel 6 such that, in the assembled state, the first panel 5 extends laterally beyond the second panel 6, which has the effect of forming a rabbet 11 in the edge 2''' of the opening leaf 2, beside the second broad face 2" of the opening leaf 2. The edge 2''' can then include, sequentially after the second broad face 2", the rabbet 11 and a part of the remaining edge 2''' joining the rabbet 11 to the first broad face 2'.

Preferably, the rabbet 11 can exhibit an L-profile including a first face parallel to the broad faces 2' and 2" of the opening leaf 2 and a second face perpendicular to the first and second broad faces 2' and 2" of the opening leaf 2, said rabbet 11, being provided to receive the frame 1, which includes a further rabbet 11', when the door is closed.

It may also be seen on the figures that the second plate 4 can be extended laterally by means of a L-shaped angle iron or bracket 12, affixed to or integrated into the second plate 4, including a first arm and a second arm, the first arm being plated and affixed to the inner face of the first plate 3 so as to provide for the assembly of the first and second metal plates 3 and 4 and preferably the fluidtightness of the empty space between the latter. The angle iron 12 can then extend, in the assembled state, the second plate 4 beyond the second panel 6 such that the second arm of the angle iron 12 forms a part of the second face of the L-shaped rabbet 11 and that the first arm of the angle iron 12 forms at least a part of the first face of the L-shaped rabbet 11.

In addition, the first plate 3 can be extended laterally to cover the remaining part of the edge 2''' and the first facing 8 can cover the first plate 3 at the remaining part of edge 2''' by the intermediary of a first tightness and thermal-break joint 13, ensuring a first thermal break.

In addition, the second facing 9 can cover the second arm of the angle iron 12 at the second face of rabbet 11 by the intermediary of a second tightness and thermal-break joint 14, ensuring a second thermal break.

The inner edge of the first face of the L-shaped rabbet 11 can include a return 15, preferably executed mainly starting with the same material as that of the first and second panels 5 and 6. Such a return 15 can be affixed to or integrated into the first panel 5 at its inner edge. In addition, the return 15 can be covered by the lateral extension of the first plate 3 of the framework 3, 4.

The return 15 can be located some distance from the second face of the latter so as to create, in a first function of the return, an anti-crushing housing space in the rabbet 11, there allowing, between the return 15 and the second face of rabbet 11, for housing and shape retention of a tightness and insulation joint 17, preferably of the synthetic neoprene-rubber foam type or other cellular, specifically fire-resistant, foam.

With the tightness and insulation joint 17 retaining its shape in rabbet 11, the possibility is understood of preventing the latter from being crushed, when the door is closed, by its contact with the frame 1, expanding laterally and parallel to the broad faces 2' and 2", and therefore preventing the loss of its effectiveness in tightness and insulation.

Moreover, the part of the frame 1 located opposite the first face of rabbet 11 can include, preferably, an intumescent tightness joint 16. The return 15 can then, in a second function, with the part of the frame 1 to which the intumescent tightness joint 16 is affixed, limit play in the maximum expansion of the latter, allowing, in the event of the door being exposed to fire, the swelling of said joint 16 to be limited and thereby preventing its degradation.

The present invention can also provide that other intumescent tightness joints 16 be disposed between the frame and the edge 2''' of the opening leaf 2.

Thus, the door according to the present invention is capable, when one of its sides is exposed to fire, of preventing excessive rises in temperature on its other, not exposed, side for the length of time that allows the very high requirements of current regulations to be met concerning thermal insulation, more particularly in conformance with the current European ELI standard (180° C.), and beyond. In addition, the door also exhibits a high level of tightness against fluids, specifically water, being capable of resisting a pressure of at least 6 m of water column on one or the other of its sides.

Of course, the invention is not limited to the embodiment described and depicted in the attached drawings. Modifications remain possible, particularly from the point of view of the make-up of various elements or by the substitution of equivalent techniques, without, for all that, departing from the protected domain of the invention.

What is claimed is:

1. A fluidtight fire door for closing an opening in a building or edifice, comprising:
    a frame;
    at least one opening leaf, mounted pivotably on the frame, by at least one hinge and including two broad faces, opposite and parallel to one another, such that a first broad face and a second broad face are bounded laterally by narrow faces, forming an edge of the at least one opening leaf, which are perpendicular to the broad faces;
    a joint, ensuring tightness between the frame and the at least one opening leaf in a closed state of the door, creating fluid-tightness therebetween,
    wherein the at least one opening leaf includes a metal framework made up of first and second rigid metal plates held apart from one another and parallel to one another and to the first and second broad faces of the at least one opening leaf, the first and second rigid metal plates surrounding an empty space capable of receiving or forming a thermal insulator and held between two layers of thermal insulation, such that a first layer and the first plate are located beside the first broad face, wherein the first layer includes a first insulating panel covering an outer face of the first plate, and such that a second layer and the second plate are located beside the second broad face, wherein the second layer includes a second insulating panel covering an outer face of the second plate,
    the first and second layers being capable of preventing, in an event of one of the broad faces being exposed to fire, propagation of heat radiation from the latter to the other one of the broad faces,
    the first and second insulating panels each including two broad sides extending, in an assembled state, parallel to the broad faces of the at least one opening leaf and narrow sides extending parallel to its edge and comprising a material with low thermal conductivity or diffusivity,
    wherein the broad sides of the first insulating panel have dimensions greater than the broad sides of the second insulating panel such that in an assembled state, the first insulating panel extends laterally beyond the second insulating panel, which has an effect of forming a rabbet in the edge of the at least one opening leaf, beside the second broad face of the at least one opening leaf, the edge including, sequentially after the second broad face, the rabbet and a remaining part of the edge joining the rabbet to the first broad face, the rabbet exhibiting an L-shaped profile including a first face parallel to the broad faces of the at least one opening leaf and a second face perpendicular to the first and second broad faces of the at least one opening leaf, the rabbet configured to receive the frame, which includes a further rabbet, when the door is closed, and
    wherein the second plate is extended laterally by an L-shaped angle iron or bracket including a first arm and a second arm, the first arm being affixed on an inner face of the first plate so as to provide for assembly of the first and second plates, and
    wherein, in the assembled state, the angle iron extends the second plate beyond the second panel such that the second arm of the angle iron forms a part of the second face of the rabbet and that the first arm of the angle iron forms at least a part of the first face of the rabbet.

2. The door according to claim 1, wherein the thermal insulator is formed by the empty space and consists of air imprisoned in the framework.

3. The door according to claim 1, wherein the thermal insulator is added and includes a material selected from the group consisting of rock, glass wool; and other material with low thermal conductivity or diffusivity filling the empty space at least partially.

4. The door according to claim 1, wherein a reinforcing structure is disposed and held securely in the empty space of the framework, if need be, sharing the empty space with the thermal insulator added or integrated into the latter.

5. The door according to claim 4, wherein the reinforcing structure is made up of rigid metal bars with an omega-shaped cross-section.

6. The door according to claim 1, wherein a layer of material capable of creating an obstacle to the radiation of heat coming from the first or the second broad face is applied, by a method selected from spraying or spattering, onto at least one of a respective inner face of the first and second metal plates.

7. The door according to claim 1, wherein the outer face of the first insulating panel is covered by a first metal facing to protect the first panel, and the outer face of the second insulating panel is covered with a second metal facing to protect the second panel.

8. The door according to claim 7, wherein the first plate extends laterally to cover a remaining part of the edge such that the first facing covers the first plate at the remaining part of the edge by an intermediary of a first tightness and thermal-break joint, ensuring a first thermal break, and wherein the second facing covers the second arm of the angle iron at the second face of the rabbet by an intermediary of a second tightness and thermal-break joint, ensuring a second thermal break.

9. The door according to claim 7, wherein each insulating panel is capable of containing or retaining water that can, in an event of one side of the door being exposed to fire, absorb heat released by the latter and can thereby form a further obstacle to propagation of heat radiation from an exposed side to an unexposed side.

10. The door according to claim 8, wherein an inside edge of the first face of the L-shaped rabbet includes a return with insulating, the return being located some distance from the second face of the rabbet so as to leave an anti-crushing housing space that allows, between the return and the second face of the rabbet, for housing and shape retention of another tightness and thermal-break joint.

11. The door according to claim 10, wherein a part of the frame located opposite the first face of the rabbet includes an intumescent tightness joint, such that the return is configured to limit play in its maximum expansion, allowing, in an event of the door being exposed to fire, swelling of the intumescent tightness joint to be limited and preventing its degradation.

12. The door according to claim 10, wherein the another tightness and thermal-break joint is selected from the group consisting of a fire-resistant synthetic foam, a fire-resistant neoprene-rubber foam, and a fire-resistant cellular foam.

13. The door according to claim 1, wherein the frame is a rigid metal material, and includes a visible face on one side of the door, when the latter is closed, which is covered, at least partially, on all or part of a periphery of an opening of the door, such that the at least one opening leaf and the frame each includes a further rabbet, and a layer of insulating material possessing a thermal insulating capacity.

14. The door according to claim 1, wherein the first and second rigid metal plates are steel-sheet type.

15. The door according to claim 1, wherein the material with low thermal conductivity or diffusivity is selected from a composite material and an inorganic material.

16. The door according to claim 15, wherein the inorganic material is calcium silicate.

* * * * *